United States Patent [19]

Coker et al.

[11] 4,402,806

[45] Sep. 6, 1983

[54] MULTI LAYER ION EXCHANGING MEMBRANE WITH PROTECTED INTERIOR HYDROXYL ION REJECTION LAYER

[75] Inventors: Thomas G. Coker, Lexington; Anthony B. LaConti, Lynnfield; Edward N. Balko, Wilmington, all of Mass.

[73] Assignee: General Electric Company, Wilmington, Mass.

[21] Appl. No.: 354,854

[22] Filed: Mar. 4, 1982

[51] Int. Cl.³ ............................ C25B 1/34; C25B 9/04
[52] U.S. Cl. ..................................... 204/98; 204/128; 204/252; 204/283; 204/296
[58] Field of Search ................. 204/98, 128, 283, 296, 204/252

[56] References Cited

U.S. PATENT DOCUMENTS 4,209,368  1/1980  Coker et al. .................. 204/128
4,313,805  2/1982  Burney et al. ................ 204/98

Primary Examiner—John F. Niebling
Attorney, Agent, or Firm—I. David Blumenfeld

[57] ABSTRACT

The performance of a permselective cation transporting membrane is improved by making the membrane a three or more layer structure in which the layer having the best hydroxyl (OH) ion rejection characteristic is in the interior of the membrane. The OH ion rejection layer, which typically has sulfonamide or carboxylic functional groups, is covered by a cation transporting layer having sulfonate functional groups to which the cathode electrode is attached by bonding or otherwise. This keeps the high caustic concentrations present at the membrane-electrode interface away from the sulfonamide, etc. rejection layer.

18 Claims, 2 Drawing Figures

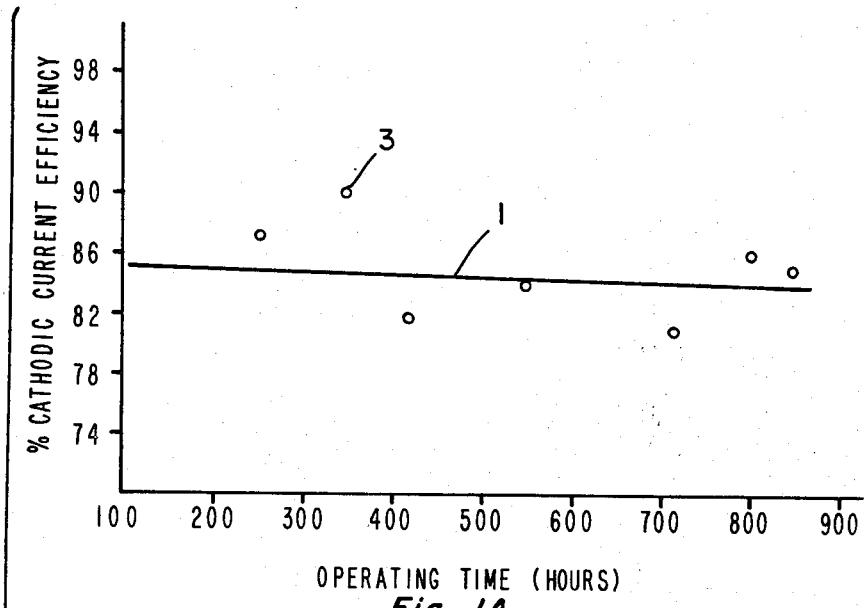
Fig. 1A
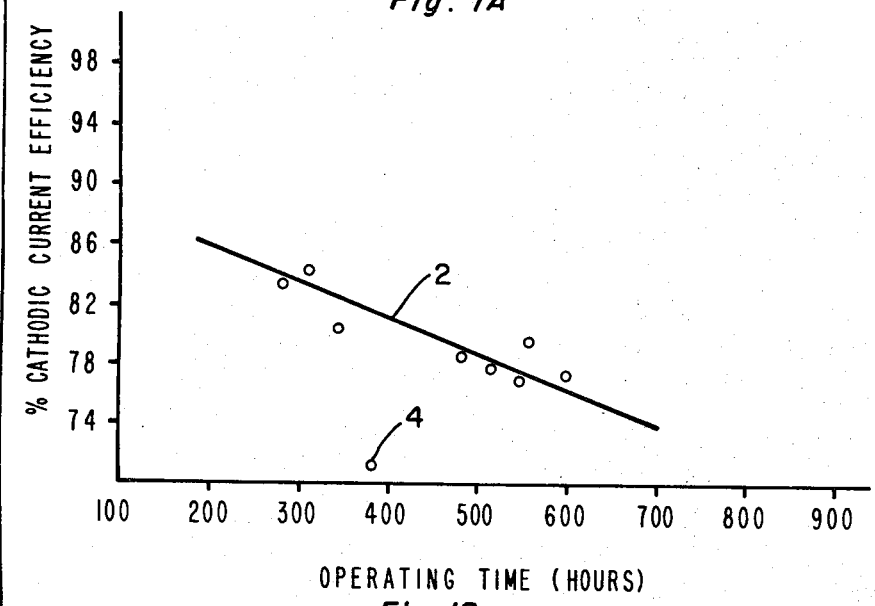
Fig. 1B
Fig. 1

MULTI LAYER ION EXCHANGING MEMBRANE WITH PROTECTED INTERIOR HYDROXYL ION REJECTION LAYER

This invention relates to a membrane and a unitary membrane and electrode assembly useful in chlor alkali production. More particularly, it relates to a multi layer membrane including a caustic rejection layer which is overlaid by a further layer to protect it from exposure to high caustic concentrations.

The use of perfluorocarbon, ion selective membranes in chlor-alkali electrolysis and other electrolysis processes is well known. One particularly effective form of such cells and processes is described in U.S. Pat. Nos. 4,224,121 and 4,210,501 assigned to the General Electric Company, the assignee of the present application. These patents illustrate the use of unitary membrane-electrode assemblies in which one or both electrodes are attached to and distributed over the surface of the permselective cation transporting membrane. One of the principal advantages of such an assembly is that the chemical reaction zone is effectively located at the interface between the membrane and the electrode attached to the surface of the membrane to minimize the IR drops caused by liquid and gaseous films normally found in membrane-electrode gaps.

Because the electrochemical reaction zone in such a unitary assembly is at the surface of the membrane, the caustic concentration at the membrane surface in such cells can be quite high. The concentration is high because the only water present at the interface to dilute the caustic is water which has diffused through the liquid pervious cathode and water brought across as part of the solvated cations ($Na^+$). Thus even though the bulk concentration in the cathode chamber may be substantially lower, high local concentrations at the membrane surface can result in damage to the cathode membrane surface and in substantial back migration of the hydroxyl ion across the membrane to the anode. This results in poor cathodic current efficiency and can result in coevolution of oxygen at the anode.

A permselective membrane or membrane layer readily transports ions of one kind, cations in the case of a cation transporting membrane and anions in the case of an anion transporting membrane, while rejecting ions of the opposite kind. However, the ability of membranes or membrane layers to reject ions of the opposite kind differs depending on various characteristics of the membrane or the layer. Thus, the water content (gms of water per gm of dry membrane) and the interstitial molality (meq of the functional groups per c.c. of pore water) affects the salt (i.e., anion) rejection characteristics of a cation membrane. The water content, in turn, is a function of other membrane variables such as the ion exchange capacity (IEC), the equivalent weight, or the nature of the functional ion transporting groups in the membrane; i.e., whether they are strongly dissociated functional groups such as sulfonates (sulfonic acid or salt), or weakly dissociated groups such as sulfonamides or carboxylates. Thus, in a multi-layer membrane, although all of the layers pass ions of one kind and reject ions of another kind, the relative capacities of the layer to reject the ions of the other kind will vary depending on the characteristics of the layer. A high rejection layer is, therefore, one that has a higher capacity for rejecting the undesired ion than do the remaining layers.

Dual layer membranes, having thin, high caustic rejection layers on the cathode side, have been proposed to inhibit back migration of hydroxyl ions. The high rejection layer which may be a high equivalent weight sulfonate layer or a layer having other functional groups can be mechanically laminated to the base layer. Alternatively, the rejection layer may be a chemically modified surface layer. In one form of a chemically modified layer, sulfonate functional groups on one surface of the membrane are treated with ethylenediamine (EDA) to form a thin sulfonamide layer; i.e., a layer of a weakly dissociated acid of a formula:

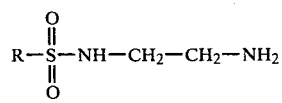

which does not imbide much water and has excellent rejection characteristics for hydroxyl ions. Alternatively, the membrane surface may be treated to convert the sulfonate to carboxylate (COOH) groups.

Sulfonamide modified membranes have excellent performance characteristics with cell voltages of 2.8 to 3.0 volts at 70° C. and 300 ASF and current efficiencies greater than 92% at caustic concentrations of 6 molar; i.e., approximately 20 weight percent of caustic. However, when exposed to high caustic concentrations, i.e. 30 weight percent, or higher, the hydroxyl ion rejection characteristic of the membrane decays fairly rapidly with time with a corresponding decrease in the cathodic current efficiency of the cell. The mechanism of performance decay is believed to involve the loss of sulfonamide exchange sites because high caustic concentrations may result in hydrolysis of the sulfonamide functional groups. That is, it is believed that the $OH^-$ ion attacks the S—NH bond converting the sulfonamide functional groups back to sulfonate functional groups:

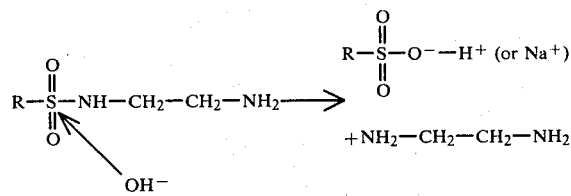

Applicant has found that deterioration of the hydroxyl ion rejection characteristics of a membrane having a sulfonamide rejection layer with time may be avoided by positioning the sulfonamide layer beneath an ion transporting protective layer to form a three layer membrane. The protective layer is resistant to caustic but is less effective as a hydroxyl ion rejection layer than the protected sulfonamide or carboxylate layer. The cathode electrode is bonded to the protective layer so that the high caustic concentration found at the electrode-membrane interface is effectively removed from the surface of the caustic sensitive high rejection layer.

In addition to protecting the surface of the hydroxyl rejection from high caustic concentrations, the protective layer serves another important function, viz, that of mechanically protecting the thin rejection layer from any damage or "punch through" as a result of the bonding of the electrode to the surface of the membrane. The cathode electrode [which typically may be a bonded agglomerate of catalytic particles and a polymeric binder] is attached to the surface of the membrane by heat and pressure, so that thin hydroxyl rejection layers are subject to damage or rupture by attachment of the electrode to the membrane. Thus, where very thin rejection layers in the order of ½ to 1½ mils, or less, are used; as is often the case where the rejection layer contains high resistance sulfonamide or carboxylic functional groups, the presence of a protective layer membrane to which the electrode is bonded prevents damage to or rupture of the thin rejection layer during the process of attaching the electrode to the membrane.

The outer layer also protects the high rejection layer from contaminating metallic Fe, Ni, or other transition metal ions. That is, in chlor-alkali cells with electrodes bonded to membrane the current collectors are in intimate contact with the electrode. These current collectors generally contain Fe, Ni, or other transition metals which thus form a source of contaminating ions. This is especially true with sulfonamides which contain diamine-type functional groups which readily chelate with Fe, Ni, Cu and other metals. In summary, the protective layer functions to protect in separate and distinct ways. It protects the high rejection layer against high caustic concentrations or any interaction of the caustic with the catalyst/membrane surface film which can effect the operational characteristics of the membrane; it physically protects the thin rejection layer against damage or rupture in the process of attaching the electrode to the membrane and; it protects the rejection layer against contaminating metal ions.

Although the instant invention is described primarily in connection with a three (3) layer membrane with a protected interior rejection layer, the invention is by no means limited thereto. Multi-layer membranes having more than three layers fall within the ambit of the invention as long as the principal or high hydroxyl ion rejection layer is covered by a protective layer to prevent exposure of the rejection layer to the high caustic concentrations at the membrane-electrode interface.

While the instant invention will be described principally in connection with the use of a multi-layer membrane in a brine electrolysis cell, the invention is obviously not limited thereto. That is, the invention is applicable to any electrolysis cell in which any form of an alkali metal hydroxide is produced at one surface of the membrane having an electrode bonded thereto. Thus feedstocks other than aqueous alkali metal halides may be utilized to produce sodium or other hydroxides at the cathode. Other alkaline metal salt solution such as sodium or potassium sulfate, sulfites and carbonates may also be used. In fact, the instant invention which involves a multilayer membrane with a protected interior layer which has a high rejection capacity for hydroxyl ions, is useful in any electrolysis process or cell using an ionically dissociable feedstock in which one of the electrolysis products is an alkali metal hydroxide.

It is therefore a principal objective of the invention to provide a membrane-electrode assembly for electrochemical cells which utilizes a multi-layer membrane having a protective layer for the primary a hydroxyl ion rejection layer.

Another objective of the invention is to provide a membrane with a hydroxyl ion rejection layer which is protected against exposure to high caustic concentrations and any interaction of caustic with the catalyst/membrane surface film.

Yet another objective of the invention is to provide a membrane-electrode assembly in which a thin hydroxyl ion rejection layer is protected against rupture during attachment of the electrode to the membrane.

Still another objective is to provide a chlor-alkali electrolysis process utilizing a multi-layer membrane with a protected high hydroxyl ion rejection layer.

Other objectives and advantages of the invention will become apparent as the description thereof proceeds.

Various objectives and advantages of the invention are realized in a membrane-electrode assembly which contains a three-layer ion transporting membrane including an interior layer which is the primary hydroxyl ion rejection layer. The interior rejection layer is covered by a cation transporting layer to which a cathode electrode is attached by bonding or otherwise. The membrane electrode assembly is mounted in a cell in which a alkali metal halide is electrolyzed to produce halogen such as chlorine in the anode compartment and caustic and hydrogen in the cathode compartment. By providing a protective layer to which the cathode electrode is bonded, the thin sulfonamide and/or carboxylate layer rejection layer is protected from the high caustic concentrations present at the interface of the electrode and the membrane; and from any interaction of caustic with the catalyst/membrane surface film; it is protected from physical damage during attachment of the electrode to the membrane and it is protected against contamination by metallic ions.

The novel features which are believed to be characteristic of the invention are set forth with particularity in the appended claims. The invention itself, however, both as to its organization and method of operation together with further advantages thereof may best understood by reference to the following description taken in connection with the accompanying drawing in which:

FIG. 1A is a graphic depiction of the cathode current efficiency of a three layer membrane as a function of time.

FIG. 1B is a graphic depiction of the cathode current efficiency of a two layer membrane as a function of time.

The novel process and the novel multi-layer membrane—with or without electrodes attached thereto—are preferably utilized in a brine electrolysis cell which is divided into anode and cathode chambers by the membrane or membrane-electrode assembly. The three-layer membrane has a main layer of a perfluorocarbon, preferably one having sulfonate (acid—$SO_3$—H or salt $SO_3$—Na) functional groups, facing the anode chamber, a thin intermediate hydroxyl ion rejection layer having sulfonamide or carboxylate functional groups and a sulfonate layer facing the cathode chamber. A liquid and gas permeable cathode electrode is attached as by bonding to the sulfonate layer which protects the primary rejection layer from the effects of the highly concentrated caustic formed at the cathode electrode.

A gas and liquid permeable anode electrode of the type shown in the aforesaid patents, may be attached to the surface of the membrane facing the anode chamber. The anode, however, does not have to be attached to the membrane as a Dimensionally Stable Anode (DSA) comprising a titanium or other valve metal substrate covered with a catalytic layer of a platinum group metal or a platinum group metal oxide may be positioned against or adjacent to the membrane surface facing the anode chamber.

In the event the electrodes are attached to the membrane, current collectors in the form of nickel or stainless steel screens or meshes are positioned against the cathode electrode and platinized niobium screens or meshes against the anode. The current collectors are, in turn, connected to a DC power source to supply current to the cell. The cell also includes stainless steel cathode and titanium anode endplates and the membrane and electrodes are positioned between the endplates.

An aqueous solution of an alkali metal halide, such as brine, containing from 150 to 300 grams of NaCl per liter, with saturated brine at 290 to 310 grams per liter being preferred, is introduced into the anode chamber through a suitable inlet conduit. Chlorine and spent brine are removed from the chamber through an outlet conduit. Water or a dilute caustic solution is introduced into the cathode chamber through an inlet conduit and hydrogen and a concentrated solution (15 to 35 weight percent) of caustic are removed through an outlet conduit.

The liquid and gas permeable electrodes attached to the membrane are preferably bonded aggregates of catalytic particles and particles of a polymeric binder such as polytetrafluorethylene (PTFE). The bonded aggregates are prepared by mixing the catalytic particles with particles of a polytetrafluorethylene binder with the weight percentage of the binder ranging from 10 to 30 weight percent. Suitable forms of the polytetrafluorethylene binder are those sold by E. I. DuPont Denemours Company, under its trade designation Teflon T-30 or T-7.

In one suitable process for fabricating electrodes, a mixture of the polymeric binder and the conductive catalytic particles—platinum black, spinels, cobalt, graphite, palladium, etc. for the cathode and platinum group metals or their oxides, i.e., ruthenium, iridium, paladium etc. in the case of the anode—are placed in a mold having desired shape and dimensions of the electrode. The mixture is heated in the mold to the sintering temperature of the binder to form the bonded electrode aggregate. The bonded structure is then placed on a thin, 2-15 mil, metallic foil of titanium, tantalum, niobium, nickel, stainless steel or aluminum. The membrane is placed over the foil supported aggregate and heat and pressure is applied to attach the aggregate to one side of the membrane and the foil is then peeled off.

The mixture of particles need not be sintered to form a bonded aggregate prior to attaching the electrode aggregate to the membrane. In an alternative procedure, the mixture is placed on the metallic foil in powder form and the membrane placed thereof. The application of heat and pressure bonds the particles to the membrane and each other to form the unitary membrane-electrode assembly.

Temperature, pressure and time parameters are not critical. Pressure may vary from 400 to 1000 psi. The temperature has an upper limit determined by the meltdown temperature of the membrane, which for most perfluorocarbon membranes is between 400° and 450° F. The lower end of the range is determined by that temperature at which adhesion becomes questionable; 250° F. seems to be the practical downside limit of the temperature range. The best temperature range is generally between 300° and 400° F. and preferably between 350° and 400°. Preferred operational conditions for bonding the electrode to the membrane are 350° F. and 1000 psi for a period of two (2) minutes. The duration of the heat and pressure cycle varies from one (1) to five (5) minutes and is most effective in the two (2) to three (3) minute range.

The novel three-layer membrane preferably consists of a main or anode side layer of a sulfonate perfluorocarbon, i.e. one having sulfonic acid, or salts thereof, as the functional groups, and is preferably in the range of 5 to 9 mils in thickness. The middle or high rejection barrier layer for hydroxyl ions is preferably one in a weak acid form, thereby reducing the water content of this portion of the membrane which in turn increases the salt rejection capability of the film and minimizes back migration of the hydroxyl ions. One of the weak acid functional groups effective in rejecting hydroxyl ions may be sulfonamide functional groups. There are various reactions which can be utilized to form the sulfonamide surface layer. One such procedure involves reacting the surface of the sulfonic acid membrane, in a form sold by DuPont under its tradename Nafion, while in the sulfonyl fluoride form with amines such as ethylene diamene (EDA) to form the layer of substituted sulfonamide functional groups. As pointed out previously, the sulfonamide layer acts as a very effective barrier layer for anions such as the hydroxyl anions thereby substantially reducing back migration and increasing the cathodic current efficiency.

Alternatively, the intermediate high rejection layer for the hydroxyl ions may be a thin, ½ mil to one (1) mil layer of a perfluorocarbon having carboxylic acid or salt functional groups. The thin layer of carboxylic functional groups may be produced by chemically treating the surface of the sulfonic acid membrane facing the cathode side. The most appropriate method of chemical treatment to convert the perfluorosulfonic acid membrane or its precursor to a perfluorocarboxylic acid membrane is one in which a sulfonyl halide group is converted to sulfinic acid which is then converted to perfluoro carboxylic acid groups through a desulfonylation reaction as shown below:

$O(CF_2)_nSO_3H \longrightarrow O(CF_2)_nSO_2Cl$

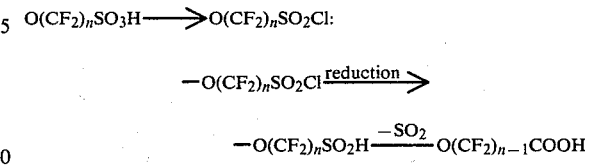

The pendant perfluorocarboxylic acid chain has one $CF_2$ less than the original pendant perfluorosulfonic acid chain.

The rejection layer should be made as thin as possible because, being a low water content sulfonamide or carboxylic acid or salt, the resistivity of such a layer is higher than that of the higher water content sulfonate acid or salt. The protective cathode side layer which is positioned over the high rejection sulfonamide or carboxylic layer is preferably a one (1) mil layer of a perfluorocarbon sulfonate, i.e., one having sulfonic acid or salt functional groups. The sulfonate layer has a much higher water content than sulfonamide or carboxylic layer and its salt rejection capacity is thus much lower. Although it will reject some OH⁻ ions and reduce the anion concentration at the interior rejection layer, its rejection capacity is much lower than that of the interior sulfonamide or carboxylate layer which constitutes the primary rejection layer.

The protective layer is bonded to the surface of the rejection layer by heat and pressure with or without support fabric between the rejection layer and the protective layer. In a preferred form the three layer membrane contains a 5-9 mil sulfonate anode side layer, a ½ to 1 mil sulfonamide or carboxylic rejection layer and a 1 to 1½ mil sulfonate protective layer.

To illustrate the innovative aspects of the instant invention and to show the performance of such an assembly in a chlor-alkali cell and its effect on the long term performance of the membrane, the following examples are provided:

EXAMPLE 1

A 5"×5" three-layer membrane was prepared consisting of a five (5) mil sulfonate anode side layer and a one and one-half (1.5) mil sulfonamide layer covered by a one (1) mil sulfonate cathode side protective layer. The protective layer was laminated to the surface of the sulfonamide rejection layer without any support cloth. 3"×3" cathode and anode electrodes were bonded to the surface of the membranes. For the anode, catalytic (Ru—25% Ir) oxide particles were prepared in an amount sufficient to provide a loading of six mg/cm². The catalytic particles were mixed with twenty (20) weight percent of DuPont T-30 PTFE particles and the mixture placed on a twelve (12) mil titanium foil. The five (5) mil thick sulfonic acid layer of the membrane was placed over the powder mixture on the foil. The electrode was attached to the anode side layer by applying pressure of 1000 psi at 350° F. for two (2) minutes. Thereafter the foil was peeled off. A mixture of platinum black catalytic particles sufficient to provide a loading of 4 mg/cm² was combined with fifteen (15) weight percent of DuPont T-30 PTFE particles and the mixture placed on a titanium foil. The other side of the membrane with the one mil sulfonic acid protective layer was placed over the mixture and a pressure of 1000 psi at 350° F. was applied for two (2) minutes to attach the cathode electrode to the membrane, leaving a three layer membrane with anode and cathode electrodes attached to the surfaces of the membrane.

The membrane electrode assembly was installed in a cell having a titanium anode endplate with inlet and outlet conduits and a stainless steel cathode endplate with inlet and outlet conduits. The endplates were separated by the membrane and EPDM gaskets to form anode and cathode chambers. A nickel screen was positioned against the cathode in the cathode chamber and a platinized niobium screen against the anode in the anode chamber. The cell was operated with an aqueous anolyte solution containing 300 grams of NaCl per liter at 80° C. and a 20 weight percent aqueous NaOH catholyte. The cell was operated at a current density of 304 amps per square ft. and the cell voltages, the bulk sodium hydroxide concentration, in the range of 5 to 11 molar, as well as cathodic current efficiency were measured and the results were as follows:

TABLE I

| Operating Time Hours | Current Actual (Amps) | Current Density (ASF) | Temp. (°C.) | Cell Volts | NaOH (Molar) | Cathodic Current Efficiency |
|---|---|---|---|---|---|---|
| 86 | 19 | 304 | 79 | 2.78 | 5.22 | 83 |
| 254 | 19 | 304 | 80 | 2.81 | 4.56 | 87 |
| 353 | 19 | 304 | 80 | 2.84 | 5.17 | 90 |
| 422 | 19 | 304 | 80 | 3.00 | 9.38 | 82 |
| 537, 540, 561 | 19 | 304 | 80 | 3.11 (Ave) | 9.56 (Ave) | 81.3 (Ave) |
| 729 | 19 | 304 | 80 | 3.59 | 11.2 | 81 |
| 800 | 19 | 304 | 80 | 3.50 | 9.12 | 86 |
| 849 | 19 | 304 | 80 | 3.67 | 10.64 | 85 |

EXAMPLE 2

A similar cell was constructed which differed only in that the membrane was a conventional two layer membrane. The membrane was a seven (7) mil thick film of 1150 EW sulfonic acid material which was modified with ethylene diamine to a depth of 1.4 mils. The cathode was bonded to the chemically modified sulfonamide layer and an anode to the other side. The cell was operated at temperatures ranging between 70°–80° C., at 300 ASF; 300 gms of NaCl/liter and the catholyte flow controlled to maintain the bulk caustic concentration between 5.5 to 6.5 Molar. The current efficiency of the cell was measured as a function of time and the results were as follows:

TABLE II

| | Operating Time (Hours) | Cathodic Current Efficiency (%) |
|---|---|---|
| 1. | 277 | 83.4 |
| 2. | 309 | 83.8 |
| 3. | 336 | 80.2 |
| 4. | 364 | 71 |
| 5. | 473 | 78.63 |
| 6. | 505 | 76.3 |
| 7. | 527 | 77.2 |
| 8. | 555 | 76.6 |
| 9. | 591 | 79.4 |
| 10. | 627 | 77.6 |

The current efficiencies of the cells in Examples 1 and 2 were plotted as a function of time in FIGS. 1A and 1B. FIG. 1A shows cathodic current efficiency of a cell using the novel three (3) layer membrane of Example 1 as a function of time. Curve 1 of FIG. 1A is a curve fitted to the individual data points of Table I with the exception data point 3 at 353 hours; which data point seems to be an anomaly.

FIG. 1B shows the cathodic current efficiency vs. time characteristic of a cell using the prior art two (2) layer membrane of Example 2 with the sulfonamide rejection layer directly exposed to the caustic. Curve 2 of FIG. 1B has been fitted to the data points of Table 2 with the exception of data point 4 at 364 hours which has been eliminated as an anomaly.

It is apparent from the data and from Curves 1 and 2 that the slope of Curve 1 is very slight. This shows that the protective layer is effective in preventing performance decay. Curve 2 has a much steeper slope and shows that the performance of a sulfonamide layer when directly exposed to caustic decays fairly rapidly with time. As may be seen from Curve 2, at the end of 600 hours the cathodic current efficiency for a two-layer membrane has dropped to the upper 70% range for bulk caustic concentrations of 5.5–6.5 Molar. This is compared to current efficiencies in the mid to upper 80's after 800 hours for caustic concentrations as high as 11 Molar for a membrane with a protected rejection layer.

It will thus be evident that a membrane with substantially improved performance life has been described; one which is particularly useful in chlor-alkali cells and processes.

While the instant invention has been in connection with preferred embodiments thereof, the invention is by no means limited thereto, since other modifications of instrumentalities employed and in the steps of the process may be made and fall within the scope of the invention. It is contemplated by the appended claims to cover any such modifications that fall within the true scope and spirit of this invention.

What we claims as new and desire to secure by Letters Patent of the United States is:

1. A multi-layer ion-transporting membrane having at least two outer and an interior layer, said outer layers adapted to be exposed to electrolysis products and anolyte and catholyte solutions to protect said interior layer from electrolysis products and anolyte and catholyte solutions, all of said layers being permselective to the passage of ions of one kind and rejecting ions of the opposite kind, the capacity of the protected interior layer to reject ions of the other kind exceeding that of the other layers in said membrane.

2. The multi-layer membrane according to claim 1 wherein the ion transporting functional groups in said interior layer retaining less water than the functional groups of the outer layers.

3. The multi layer membrane, according to claim 1, wherein the membrane is cation transporting and the anion rejecting capacity of the interior layer exceeds that of the outer layers.

4. The multi layer membrane, according to claim 3, wherein the functional groups of the interior layer are chosen from sulfonamides and carboxylates.

5. The multi layer membrane, according to claim 1, wherein the functional groups of the interior layer includes sulfonamides.

6. A membrane-electrode assembly for an electrochemical cell including a multi-layer membrane, permselective to the passage of ions of one kind, said membrane having at least two outer layers and an interior layer, said outer layers protecting said interior layer from direct exposure to electrolysis products and anolyte and catholyte solutions, the capacity of the protected interior layer to reject ions of the opposite kind exceeding that of the other layers, and electrode means attached to at least one of said outer layers to form a unitary membrane-electrode structure.

7. The membrane-electrode assembly according to claim 6 wherein an electrode is attached to the outer layer at which ions of the other kind are present and involved in an electrochemical reaction.

8. A unitary membrane and electrode structure including a multi-layer permselective membrane having at least two cation conductive outer layers and a cation conductive interior layer, said outer layers protecting said interior layer from direct exposure to electrolysis products and anolyte and catholyte solutions, the capacity of the interior layer to reject anions exceeding that of the outer layers, and a gas and liquid permeable catalytic electrode attached to at lease one of said outer layers to form a unitary membrane electrode structure with a protected interior anion rejection layer.

9. A membrane electrode structure according to claim 8 wherein the interior layer has functional groups chosen from sulfonamides and carboxylates.

10. The membrane and electrode structure according to claim 9 wherein the interior layer has sulfonamide functional groups.

11. A cell for the electrolysis of aqueous compounds for production of alkali metal hydroxides comprising:
   (a) a housing
   (b) a permselective, multi-layer cation transporting membrane separating said housing into anode and cathode chambers, said membrane comprising at least two outer layers and an interior layer, the outer layers facing the anode and cathode chambers respectively and protecting the interior layer from electrolysis products, the capacity of the interior layer to reject anions exceeding that of the outer layers,
   (c) anode and cathode electrodes at which electrolysis takes place positioned respectively in said anode and cathode compartments at least said cathode electrode being physically bonded to an outer layer whereby the interior anion rejection layer is not directly exposed to the alkaline metal hydroxide formed at said cathode,
   (d) means to apply current to the electrodes to electrolyze an anolyte brought into the anode chamber to produce alkali metal hydroxide at the cathode electrode in the cathode chamber.

12. The electrolytic cell according to claim 11 wherein said multi-layer membrane has an interior hydroxyl ion rejecting layer having ion transporting functional group chosen from sulfonamide and carboxylate functional groups.

13. The electrolytic cell according to claim 11 wherein said interior anion rejection layer has sulfonamide functional groups.

14. The electrolytic cell according to claim 11 wherein said multi-layer membrane has sulfonate functional group in the outer layers and sulfonamide functional groups in the interior anion rejection layer.

15. In the process of generating an alkali metal hydroxide by electrolyzing an aqueous alkali metal compound between an anode and cathode separated by the multi-layer cation exchange membrane according to claim 1 having at least the cathode at which said alkali metal hydroxide is generated bonded to one surface of the membrane, said multi-layer membrane comprising at least two outer layers and a interior layer having a higher capacity for rejecting hydroxyl ions than the outer layers whereby said hydroxyl ion rejecting interior layer is not directly exposed to the alkali metal hydroxide form at said cathode.

16. The process according to claim 15 wherein the functional groups in said interior layer are more weakly dissociated than the functional groups in the outer layers whereby said interior layer has a greater rejection capacity for hydroxyl ion than the other layers.

17. The process according to claim 16 wherein the weakly dissociated functional groups are chosen from the group including sulfonamide and carboxylate functional groups.

18. The process according to claim 16 wherein the weakly dissociated functional groups of said interior layer comprise sulfonamide functional groups.

* * * * *